United States Patent [19]

Snead

[11] Patent Number: 4,867,256

[45] Date of Patent: Sep. 19, 1989

[54] INJECTION OF POLYMER CHEMICALS INTO DRILLING MUD

[76] Inventor: Eddie L. Snead, 1626 N. Lexington Blvd., Corpus Christi, Tex. 78409

[21] Appl. No.: 294,391

[22] Filed: Jan. 9, 1989

Related U.S. Application Data

[63] Continuation of Ser. No. 58,504, Jun. 5, 1987, abandoned.

[51] Int. Cl.$^4$ .............................................. E21B 7/00
[52] U.S. Cl. ....................................... 175/66; 175/65; 175/206; 175/212; 175/216; 175/217
[58] Field of Search ............... 175/65, 66, 72, 206, 175/207, 212, 216, 217, 314; 166/75.1, 305.1; 252/8.51

[56] References Cited

U.S. PATENT DOCUMENTS

| | | | |
|---|---|---|---|
| 2,338,174 | 1/1944 | Garrison | 175/206 X |
| 2,886,287 | 5/1959 | Croley | 175/206 |
| 2,923,151 | 2/1960 | Engle et al. | 175/217 X |
| 3,472,325 | 10/1969 | Lummus | 175/66 |
| 3,500,943 | 3/1970 | Bingman, Jr. | 175/66 |
| 3,502,543 | 3/1970 | Sewell | 175/65 X |
| 4,599,117 | 7/1986 | Luxemburg | 175/66 X |

Primary Examiner—George A. Suchfield
Attorney, Agent, or Firm—G. Turner Moller

[57] ABSTRACT

The mud of a drilling well is treated by injecting a liquid polymer chemical into the suction of a main circulating mud pump rather than by pouring the liquid chemical into the open collar of a drill pipe joint while making a connection. This causes the mud to exhibit lower gel strengths and obtain a bore hole more nearly to gauge.

7 Claims, 1 Drawing Sheet

U.S. Patent
Sep. 19, 1989
4,867,256
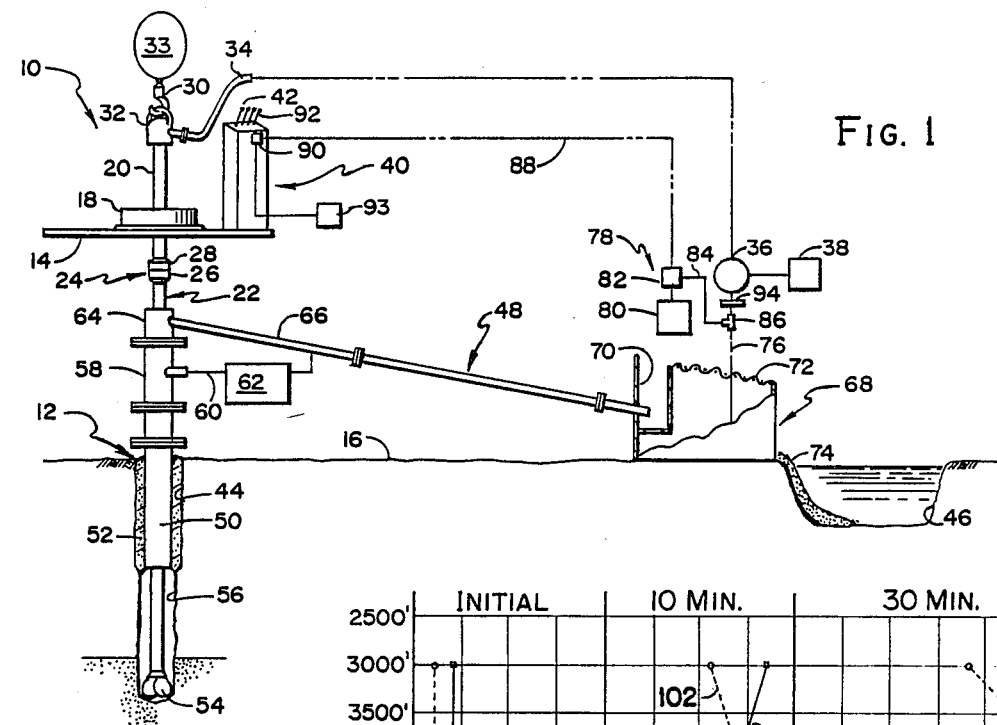
FIG. 1
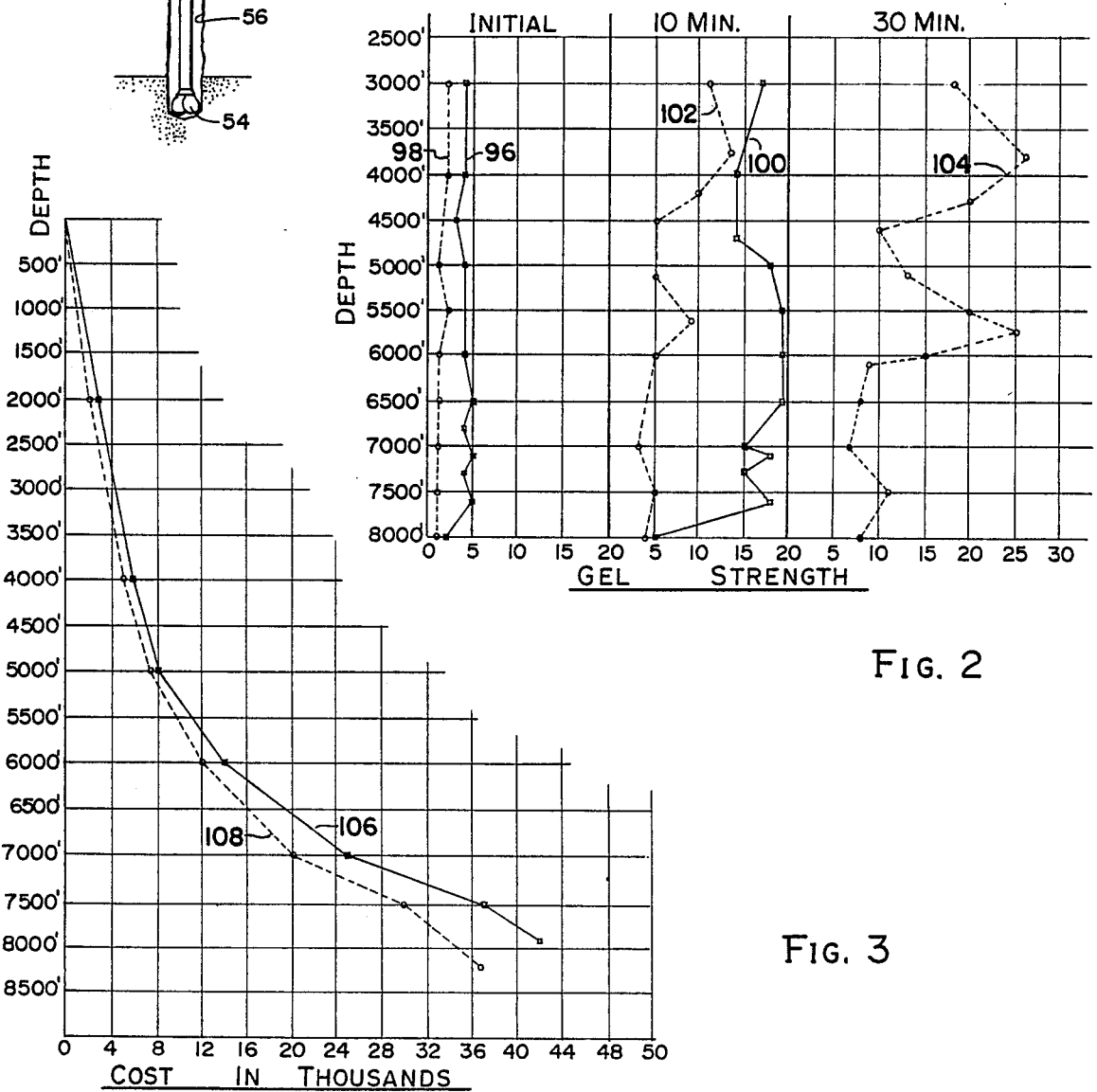
FIG. 2
FIG. 3

INJECTION OF POLYMER CHEMICALS INTO DRILLING MUD

This application is a continuation of application Ser. No. 07/058,504, filed June 5, 1987, now abandoned.

This invention relates to the pressure injection of polymer chemicals into drilling mud.

Drilling mud is a more-or-less complex slurry of chemicals in a liquid carrier that is circulated in a well bore during drilling to perform a variety of functions. The drilling mud cools and lubricates the bit, delivers hydraulic horsepower to the bit, carries cuttings upwardly in the hole during circulation, suspends the cuttings vertically in the bore hole when circulation stops, prevents blowouts, minimizes water loss into permeable formations and performs assorted other functions. There are all sorts of drilling muds. The most elementary drilling mud is water mixed with drilled solids and is often called "native" drilling mud. The drilled solids add weight to the slurry which raises the density of the mud to 9.2–9.9 #/gallon which is sufficient to control normal pressures at shallow depths in many actively drilled areas.

Native mud was the earliest used in the rotary drilling of oil and gas wells. It was soon discovered that native drilling mud provides almost no control over the loss of water into permeable formations, tends to wash out or enlarge the diameter of the hole, accumulate shale balls on the bit and have other major disadvantages. Since that time, a wide variety of chemicals have been added to drilling mud to overcome real or perceived problems with native drilling mud.

Almost all water based drilling muds start off with a native drilling mud to which gel or bentonite is added. The standard drilling mud in many areas of the world is now a native drilling mud to which has been added bentonite, sodium hydroxide, chrome lignosulfonate and lignite. In the event greater weight is needed, barium sulfate is added.

This type drilling mud is now being supplanted by a native drilling mud-bentonite mixture to which is added a liquid polymer chemical. The technique presently used to mix this chemical with the preexisting native mud or native mud-bentonite mixture is simplicity itself. Usually, native mud is used to drill to a predetermined depth and, thereafter, bentonite and/or polymer are added. Powdered bentonite is added through a conventional hopper. The liquid polymer is added by pouring some, e.g. a half-pint, pint or quart, of the polymer into the upstanding drill pipe collar every time a connection is made, i.e. every time a new joint of drill pipe is added to the drill string during drilling. When the drill pipe is reconnected to the kelly and drilling recommences, the polymer is pumped downwardly through the drill pipe and exits through the bit nozzles at the bottom of the hole. Because drill pipe joints are usually 30' long, polymer is added at the end of every 30' of new hole. Presumably, some mixing of the polymer and the native drilling mud occurs when the polymer is moving down the drill pipe. This probably creates a slug of high viscosity mud which is diluted by native drilling mud during the trip up the annulus to the surface. By whatever mixing process, the native drilling mud is gradually converted into a more-or-less homogenous native drilling mud-polymer mixture within a few thousand feet of hole.

One desirable characteristic of a drilling mud is that it sets up or gels, like Jello, as it sits quietly. This characteristic is desirable so that cuttings in the drilling mud don't fall by gravity through the drilling mud when circulation stops. It is desirable, however, that gel strengths remain relatively low in order to restart circulation. For example, if the drill pipe gets stuck and circulation is stopped for an hour to connect, at the surface, the equipment needed to get unstuck, there is plenty of time for the mud to set up. If the gel strength is high, it is difficult to restart circulation. As a rule, the gel strength of a drilling mud is proportional to viscosity, i.e. the lower the viscosity, the lower the gel strength. Thus, it would appear that if low gel strength is desired, one would add less chemical because the more chemical one adds, the high the viscosity becomes. The mud engineer always tries to keep viscosity as low as possible for several reasons: (1) the lower the viscosity, the less chemical added, the less the cost; and (2) the lower the viscosity, the faster that drilling may proceed. But viscosity has to be relatively high to carry the cuttings out of the hole and there has to be enough chemical in the mud to control water loss and hole wash out. Thus, there are many trade offs in managing a mud system, not just a trade off between viscosity and gel strength.

The technique of this invention is to inject, by pressure, liquid polymer chemical into the mud system of a drilling rig, either while the water based mud is circulating or when circulation is momentarily stopped. There is evidence to show that this technique creates a polymer type drilling mud having an initial low gel strength which remains lower than polymer type drilling muds created by he normal process of pouring a quantity of polymer into the collar of the drill pipe joint and then pumping the polymer down the hole.

It is accordingly an object of this invention to provide an improved technique for preparing a polymer-native mud mixture.

Another object of this invention is to provide an improved polymer-native mud mixture exhibiting a low gel strength.

Other objects and advantages of this invention will become more fully apparent as this description proceeds, reference being made to the accompanying drawings and appended claims.

IN THE DRAWINGS

FIG. 1 is a partially schematic view of a well being drilled with a rig incorporating the mud mixing system of this invention, FIG. 2 is a chart showing the relationship between time and gel strength of a drilling mud prepared by the technique of this invention and that of a conventional polymer drilling mud; and FIG. 3 is a chart showing the relationship between time and total depth of two comparable wells drilled with a polymer drilling mud of this invention and drilled with a conventional polymer drilling mud.

Referring to FIG. 1, there is illustrated a drilling rig 10 being used to drill a well 12. The drilling rig 10 comprises a floor 14 supported above the ground 16 by a substructure (not shown), a rotary table 18 for turning a kelly 20 connected to a drill string 22 extending into the well 12. The drill string 22 comprises a multiplicity of connections 24 including an upwardly facing collar 26 and a downwardly extending pin 28. The rig 10 further comprises a hook 30 supporting a swivel 32 connected to the kelly 20 and, in turn, supported by a travelling block 33, and a mud hose 34 receiving mud from a pump 36 driven by a motor 38. A driller's console 40 is located on the floor 14 within sight of the rotary table 18 and includes a plurality of control levers or buttons 42 for operating the drawworks clutch, brake or the like (not shown).

When drilling a surface hole 44, return mud merely flows out of the hole 44 into a ditch (not shown) leading to an earthen pit 46 comprising part of a mud system 48. The surface hole 44 is usually drilled with "spud" mud—watered down mud from a previously drilled well. There is normally no blowout danger in the surface hole 44 but something other than simple native mud is used in the surface hole 44 to prevent sticking of the drill string. After the surface hole 44 is drilled, a string of surface pipe 50 is run and secured in place by cement 52 in a conventional manner.

After the cement 52 has cured, a bit 54 is connected to the bottom of the drill string 22 run into the well 12 for drilling a bore hole 56 underneath the surface pipe 50. On top of the surface pipe 50 is a blowout preventer 58 having an outlet 60 connected to a choke manifold 62.

In the normal course of drilling, mud pumped downwardly through the drill string 22 flows upwardly in the annulus between the drill string 22 and the bore hole 56 to exit from a standpipe 64 into a mud return line 66. The mud return line 66 delivers return mud into the mud system 48 which may be relative simple earthen pits typical of shallow wells or a more elaborate above ground mud tank 68 typical of deeper wells. The return line 66 usually delivers return mud to an inlet box 70 overflowing onto a shale shaker 72. Shale and large cuttings are discharged from the shaker 72 into a pile 74 in a shale pit which may be the same pit 46 used when drilling the surface hole 44. A conduit 76 leads from the mud tank 68 to the mud pump 36 thereby completing the mud circuit. Those skilled in the art will recognize the rig 10, as heretofore described, as being typical of a modern moderate to deep drilling rig equipped with a mud tank.

In the past, liquid polymer has been added to the mud of a rig when making a connection, i.e. when the kelly 20 has been removed from the drill string 22 and a new joint of drill pipe added to the drill string 22. When this occurs, the connection between the kelly 20 and the uppermost joint of drill pipe is broken leaving the collar 26 thereof open. To treat the mud, one of the roughnecks pours a quantity of the liquid polymer into the open collar 26. The new joint of drill pipe is then threaded into the collar 26 and the kelly 20 reattached to the drill string 22. When the mud pump 36 is restarted, the liquid polymer is pumped down the drill string 22, exits through the bit 54 and travels up the annulus to the standpipe 64. By the time the liquid polymer reaches the surface, it has been diluted by and been mixed with the native mud in the well to become a more-or-less homogenous mixture.

In contrast and in accordance with this invention, liquid polymer is added to te mud system 48 by a pressure injection system 78. Although the pressure injection system 78 may deliver the liquid chemical on the outlet end of the pump 36, it is much preferred that the injection system 78 deliver the liquid polymer into the inlet conduit 76 for two reasons: (1) the injection system 78 may be much simpler because it may be of relatively low pressure construction; and (2) there are suggestions that beneficial mixing between the liquid polymer and the pre-existing mud occurs in the pump 36.

To these ends, the pressure injection system 78 includes a reservoir 80 of the liquid polymer. The liquid polymer is usually available in 55 gallon drums and these drums are eminently suitable for use as the reservoir 80. A pump 82 is mounted on or near the drum 80 and is selectively energized by compressed air, electricity or the like. Because compressed air is available on rigs of the size contemplated for use with this invention, is easy to handle and is relatively safe, it is the preferred choice for powering the pump 82. Thus, the pump 82 is a compressed air driven pump of any suitable type, e.g. an Alemite model 7216-13. The pump 82 delivers pressurized liquid polymer through a conduit 84 into a fitting 86 upstream of the pump 36. The pump 82 is driven by compressed air from an air line 88. Air flow though the air line 88 is controlled by a valve 90 operated by a control lever 92 at the driller's console 40 and connected to a source 93 of compressed air.

Thus, the driller can inject liquid polymer into the mud system 48 of the rig 10 while mud is circulating, i.e. while the pump 36 is operating or when circulation is momentarily stopped, as occurs when making a connection. Indeed the simplest technique to be certain that liquid chemical is added at the appropriate interval is to operate the injection system 78 during each connection.

One of the peculiarities that has been learned about the injection system 78 relates to a screen 94 used adjacent the inlet of the pump 36 to keep out large articles entrained in the mud. It has been learned that the conduit 84 should be within a few feet, less than about 10 feet and preferably less than three feet, of the screen 94. If the conduit 84 injects liquid polymer into the conduit 76 too far upstream from the screen 94, there is a risk that the polymer will make a viscous slug with the preexisting mud and periodically plug the screen 94 thereby requiring the use of a standby pump (not shown) until the screen 94 is removed and cleaned.

The liquid polymer used to control water loss in drilling mud is available from any major mud company. The polymer is hydrolyzed polyacrylamide. It appears this polymer is offered by all of the major mud companies and is available from the same source. Thus, any difference in results would appear to be due to some extraneous factor.

Gel strength is one of those mud parameters measured by a mud engineer during each analysis and recommendation and is measured using a Fann Model 34 Viscosimeter. This type viscosimeter comprises a stationary plumb bob and a cylinder which fits over the plumb bob and is rotatably driven. An initial gel strength is obtained by agitating a mud sample, pouring the mud sample into a cup, inserting the cylinder of the viscosimeter into the mud and drivably rotating the cylinder. The drive motor is stopped and the cylinder comes to rest. The plumb bob is then turned and amount of force necessary to turn the plumb bob is measured. This measurement is the initial gel strength. At the end of a ten minute wait, without further agitating the mud, the plum bob is again turned and the amount of force necessary to turn it is measured. This measurement is the ten minute gel strength. After a thirty minute wait, the plumb bob is again turned and the amount of force measured. As a general rule, the lower the viscosity, the lower the gel strength. The change of gel strength over time is a more complicated matter.

FIG. 2 illustrates a comparison in gel strengths between two polymer muds used on adjacent wells in Zapata County, Tex. The addition of liquid polymer started at 3000' and continued to total depth. The solid line 96 in the left third of FIG. 2 shows the initial gel strength of the polymer mud in which the liquid polymer was added by pouring one cup of polymer into the collar of the upstanding drill pipe joint every time a connection was made. The dashed line 98 in the left third of FIG. 2 shows the initial gel strength of the polymer mud in which the liquid polymer was added by the injection system 78 of this invention. It will be seen that the mud prepared in accordance with this invention had a lower initial gel strength than the conventional mud at all depths.

The curves in the middle of FIG. 2 were generated from data points acquired from ten minutes gel strength measurements on the adjacent wells. The solid line 100 was obtained from data taken from the conventional mud system and showed gel strengths as high as 19. The highest ten minute gel strength of the mud prepared by this invention was 13.

The curve in the right third of FIG. 2 was generated from data points acquired from thirty minute gel strength measurements on the well using the approach of this invention. No thirty minute measurements were available from the adjacent well. The dashed line 104 shows a general pattern comparable to but amplified from the dashed line 102, i.e. at depths where the ten minute gel strength was higher, the thirty minute gel strength was higher still. It is noted that the mud centrifuge and mud cleaner on the well using this invention had malfunctions at a depth of 5600–5700' which is believed to have caused the increase in gel strength. It is seen that gel strength of a mud increases with the length of time since last agitation. With the exception of the depth interval during which the mud centrifuge and mud cleaner were not operating, the 30 minute gel strength readings on the mud prepared by this invention were no higher than the 10 minute gel strengths of the mud prepared conventionally.

FIG. 3 is a chart showing the relationship between depth and mud costs of the adjacent wells used in the illustration of FIG. 2. The solid line 106 is the relationship of depth to cost of the adjacent well and the dashed line 108 shows the depth-cost relationship of the well employing this invention. The real comparison is better than that shown in this chart for two reasons. First, the mud weight at total depth in the well using the drilling mud of this invention was 11.4 #/gal while the mud in the offset well was only 10.7 #/gal. This increase in mud weight offered the operator greater assurance against blow outs or kicks but obviously required additional barite. Second, the well using the approach of this invention reached total depth at 8200' in seventeen days while the offset well reached total depth at 7950' in twenty one days. Thus, the operator using the injection system of this invention experienced better drilling rates, at less cost and with less risk of blowout or kicks.

The reduction in mud costs appears to be caused by a tendency of the bore hole 52 drilled by muds prepared in accordance with this invention to be more nearly to gauge, i.e. when measured, the bore hole 52 tends to be more nearly the same size as the bit 54. In other words, there appears to be less wash out of the bore hole 52 when using the polymer injection system of this invention. Because the hole is smaller, there is less total mud to be mixed and treated because the total quantity of mud in the system 48 is the quantity in the hole plus the quantity in the tank 68. Keeping the hole more nearly in gauge is also an advantage when the time comes to cement a long string in the bore hole 52 because there is a better chance of obtaining a good cement job while using less cement.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A technique of drilling a bore hole into the earth with a rig including a mud system and a drill string, comprising
   pumping, with a pump, a water based mud down the drill string;
   circulating the water based mud up an annulus between the drill string and the bore hole; and
   introducing a liquid hydrolyzed polyacrylamide water loss controlling polymer into the water based mud and decreasing the gel strength of the polyacrylamide-water based mud combination by pressure injecting the liquid polymer into the mud system.

2. The technique of claim 1 wherein the pressure injecting step occurs at a time when mud is flowing in the mud system.

3. The technique of claim 1 wherein the pressure injecting step occurs at a time when mud is not flowing in the mud system.

4. The technique of claim 1 wherein a pump having an inlet conduit circulates the mud and the pressure injecting step comprises injecting the liquid polymer into the inlet conduit.

5. The technique of claim 4 wherein the pump comprises a screen in the inlet conduit and the pressure injecting step comprises injecting the liquid conduit upstream of the screen and less than 10' therefrom.

6. The technique of claim 1 wherein the mud is selected from a group consisting of native drilling mud and a mixture of native drilling mud and bentonite.

7. A technique of drilling a bore hole into the earth with a rig including a mud system, comprising
   circulating a water based mud through the mud system and bore hole; and
   introducing a water loss controlling liquid polymer into the mud and maintaining a low gel strength by pressure injecting the liquid polymer into the mud system at a time when mud is not flowing in the mud system.

* * * * *